(12) United States Patent
Gupta et al.

(10) Patent No.: US 11,074,434 B2
(45) Date of Patent: Jul. 27, 2021

(54) DETECTION OF NEAR-DUPLICATE IMAGES IN PROFILES FOR DETECTION OF FAKE-PROFILE ACCOUNTS

(71) Applicant: Microsoft Technology Licensing, LLC, Redmond, WA (US)

(72) Inventors: Vipin Gupta, Bangalore (IN); Shubham Agarwal, Karnataka (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 477 days.

(21) Appl. No.: 15/964,863

(22) Filed: Apr. 27, 2018

(65) Prior Publication Data

US 2019/0332849 A1 Oct. 31, 2019

(51) Int. Cl.
  *G06K 9/00* (2006.01)
  *G06K 9/62* (2006.01)
  (Continued)

(52) U.S. Cl.
  CPC ......... *G06K 9/00288* (2013.01); *G06F 16/56* (2019.01); *G06F 16/5838* (2019.01);
  (Continued)

(58) Field of Classification Search
  CPC .......... G06K 9/00288; G06K 9/00268; G06K 9/6215; G06K 9/00228; G06K 9/00275;
  (Continued)

(56) References Cited

U.S. PATENT DOCUMENTS

| 5,909,509 A * | 6/1999 | Chiang | G06K 9/6857 |
| | | | 382/159 |
| 7,644,052 B1 * | 1/2010 | Chang | G06N 5/022 |
| | | | 706/45 |

(Continued)

OTHER PUBLICATIONS

Frolova, Natalya, "How Face Recognition Helps Public Safety—FindFace blog", [Online]. Retrieved from the Internet: <URL: https://blog.findface.pro/en/how-face-recognition-helps-public-safety/#more-107/>, (Jan. 3, 2017), 13 pgs.

(Continued)

*Primary Examiner* — Xuemei G Chen
(74) *Attorney, Agent, or Firm* — Hickman Becker Bingham Ledesma LLP

(57) ABSTRACT

Methods, systems, and computer programs are presented for detecting near-duplicate profile images of the users in a social network. One method includes operations for identifying an image in a profile of a user of the social network, determining a query feature vector for the image, the query feature vector comprising a set of features, and determining a dominant feature from the features, the dominant feature having a highest value from the values of the features. Further, the method includes operations for determining a bucket in a database of feature vectors based on the dominant feature, determining if the query feature vector is a near duplicate of any feature vector in the determined bucket, and determining if the profile of the user is a duplicate profile or a fake profile based on whether the query feature vector is a near duplicate of any feature vector in the determined bucket.

20 Claims, 10 Drawing Sheets

(51) Int. Cl.
*G06N 3/08* (2006.01)
*G06F 16/56* (2019.01)
*G06F 16/583* (2019.01)

(52) U.S. Cl.
CPC ..... *G06K 9/00228* (2013.01); *G06K 9/00268* (2013.01); *G06K 9/6215* (2013.01); *G06N 3/08* (2013.01)

(58) Field of Classification Search
CPC . G06K 9/00899; G06F 16/56; G06F 16/5838; G06N 3/08; G06N 3/0454; G06N 3/084
See application file for complete search history.

(56) References Cited

U.S. PATENT DOCUMENTS

| | | | | |
|---|---|---|---|---|
| 8,099,442 B2* | 1/2012 | Xiao | G06N 20/00 | 707/803 |
| 8,140,505 B1* | 3/2012 | Jain | G06F 16/9014 | 707/706 |
| 8,159,550 B2* | 4/2012 | Paine | G06T 3/4038 | 348/222.1 |
| 8,364,708 B1* | 1/2013 | Braytenbaum | G06F 16/9535 | 707/776 |
| 8,793,187 B2* | 7/2014 | Alvarez | G06Q 20/1085 | 705/41 |
| 9,147,117 B1* | 9/2015 | Madhu | G06K 9/00288 | |
| 10,089,521 B2* | 10/2018 | Kolleri | G06F 16/29 | |
| 10,127,246 B2* | 11/2018 | McElmurray | G06F 16/583 | |
| 10,322,728 B1* | 6/2019 | Porikli | G06K 9/00845 | |
| 10,325,223 B1* | 6/2019 | Arel | G06Q 10/0635 | |
| 10,552,471 B1* | 2/2020 | Dandekar | G06F 16/535 | |
| 2003/0103652 A1* | 6/2003 | Lee | G06K 9/00288 | 382/118 |
| 2006/0013450 A1* | 1/2006 | Shan | G06K 9/00201 | 382/123 |
| 2006/0050953 A1* | 3/2006 | Farmer | G06K 9/4642 | 382/159 |
| 2006/0251338 A1* | 11/2006 | Gokturk | G06F 16/583 | 382/305 |
| 2006/0251339 A1* | 11/2006 | Gokturk | G06K 9/46 | 382/305 |
| 2010/0077015 A1* | 3/2010 | Eshghi | G06F 17/10 | 708/400 |
| 2011/0116690 A1* | 5/2011 | Ross | G06K 9/622 | 382/118 |
| 2012/0246089 A1* | 9/2012 | Sikes | H04M 1/72536 | 705/325 |
| 2012/0321181 A1* | 12/2012 | Yang | G06K 9/4609 | 382/165 |
| 2013/0039584 A1* | 2/2013 | Harmanci | G06F 16/583 | 382/197 |
| 2013/0066452 A1* | 3/2013 | Kobayashi | G06N 20/00 | 700/94 |
| 2014/0044361 A1* | 2/2014 | Lee | G06K 9/481 | 382/201 |
| 2014/0045456 A1* | 2/2014 | Ballai | H04W 12/1206 | 455/410 |
| 2014/0046942 A1* | 2/2014 | Ravid | G06F 16/93 | 707/737 |
| 2014/0086492 A1* | 3/2014 | Iwamura | G06K 9/62 | 382/190 |
| 2015/0227557 A1* | 8/2015 | Holzschneider | G06K 9/00671 | 382/218 |
| 2016/0005050 A1* | 1/2016 | Teman | G06Q 30/018 | 705/317 |
| 2016/0132750 A1* | 5/2016 | Yang | G06F 16/56 | 382/197 |
| 2017/0024384 A1* | 1/2017 | Kant | G06F 16/51 | |
| 2017/0041330 A1* | 2/2017 | Hunt | H04L 63/1416 | |
| 2017/0085722 A1* | 3/2017 | Polega | H04M 17/02 | |
| 2017/0089706 A1* | 3/2017 | Ribeiro | G01R 33/10 | |
| 2018/0041504 A1* | 2/2018 | Balasubramanian | H04L 63/102 | |
| 2018/0052904 A1* | 2/2018 | Fusco | G06F 16/24578 | |
| 2018/0211041 A1* | 7/2018 | Davis | G06F 21/566 | |
| 2018/0276488 A1* | 9/2018 | Yoo | G06K 9/00228 | |
| 2018/0357548 A1* | 12/2018 | Nichols | G06N 5/04 | |
| 2019/0130167 A1* | 5/2019 | Ng | G06K 9/00255 | |
| 2019/0180086 A1* | 6/2019 | Zhang | G06T 7/90 | |
| 2019/0236490 A1* | 8/2019 | Harang | G06F 21/56 | |
| 2019/0272341 A1* | 9/2019 | Lu | G06F 16/908 | |
| 2019/0272344 A1* | 9/2019 | Lu | G06K 9/6215 | |
| 2019/0303754 A1* | 10/2019 | Ranjan | G06N 3/08 | |
| 2019/0311182 A1* | 10/2019 | Mishra | G06K 9/00228 | |

OTHER PUBLICATIONS

Johnson, Jeff, et al., "Billion-scale similarity search with GPUs", arXiv preprint arXiv:1702.08734, [Online]. Retrieved from the Internet: <URL: https://arxiv.org/pdf/1702.08734.pdf>, (2017), 1-12.
Ke, Yan, et al., "Efficient Near-duplicate Detection and Sub-image Retrieval", ACM Multimedia. vol. 4. No. 1, (Aug. 2004), 10 pgs.
Kim, Saehoon, et al., "Bilinear Random Projections for Locality-Sensitive Binary Codes", Proceedings of the IEEE Conference on Computer Vision and Pattern Recognition, (2015), 1338-1346.
Liong, Veniceerin Erin, et al., "Deep Hashing for Compact Binary Codes Learning", Proceedings of the IEEE Conference on Computer Vision and Pattern Recognition, (2015), 2475-2483.
Rosebrock, Adrian, "Fingerprinting Images for Near-Duplicate Detection", Real Python, [Online]. Retrieved from the Internet: <URL: https://realpython.com/blog/python/fingerprinting-images-for-near-duplicate-detection/>, (Accessed May 8, 2018), 11 pgs.
Zhao, Wan-Lei, et al., "Scale-Rotation Invariant Pattern Entropy for Keypoint-based Near-Duplicate Detection", IEEE Transactions on Image Processing 18(2), (2009), 412-423.

* cited by examiner

US 11,074,434 B2

DETECTION OF NEAR-DUPLICATE IMAGES IN PROFILES FOR DETECTION OF FAKE-PROFILE ACCOUNTS

TECHNICAL FIELD

The subject matter disclosed herein generally relates to methods, systems, and programs for detecting fake profiles in a user network, and more particularly, methods, systems, and computer programs for detecting the fake profiles by analysis of profile images.

BACKGROUND

A profile image is part of the profile data for users of a social network. Often, users create multiple profiles with unethical intentions, such as spamming, impersonating someone famous, fraud, etc. Many times, the fraudulent users create accounts that have very similar profile data, but changing the name of the user, and the similar data may include the profile picture, so several profiles in the social network may have the same profile picture.

Further, the fraudulent users sometimes change the image slightly so a program detecting duplicate profile images would not detect the duplicate profiles. They may make small changes to the profile image, such as cropping the image, changing the brightness or color, etc., and create a near-duplicate image. Since a program searching for duplicate images checks that the images are exactly the same, the near-duplicate images will not be detected by the program.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
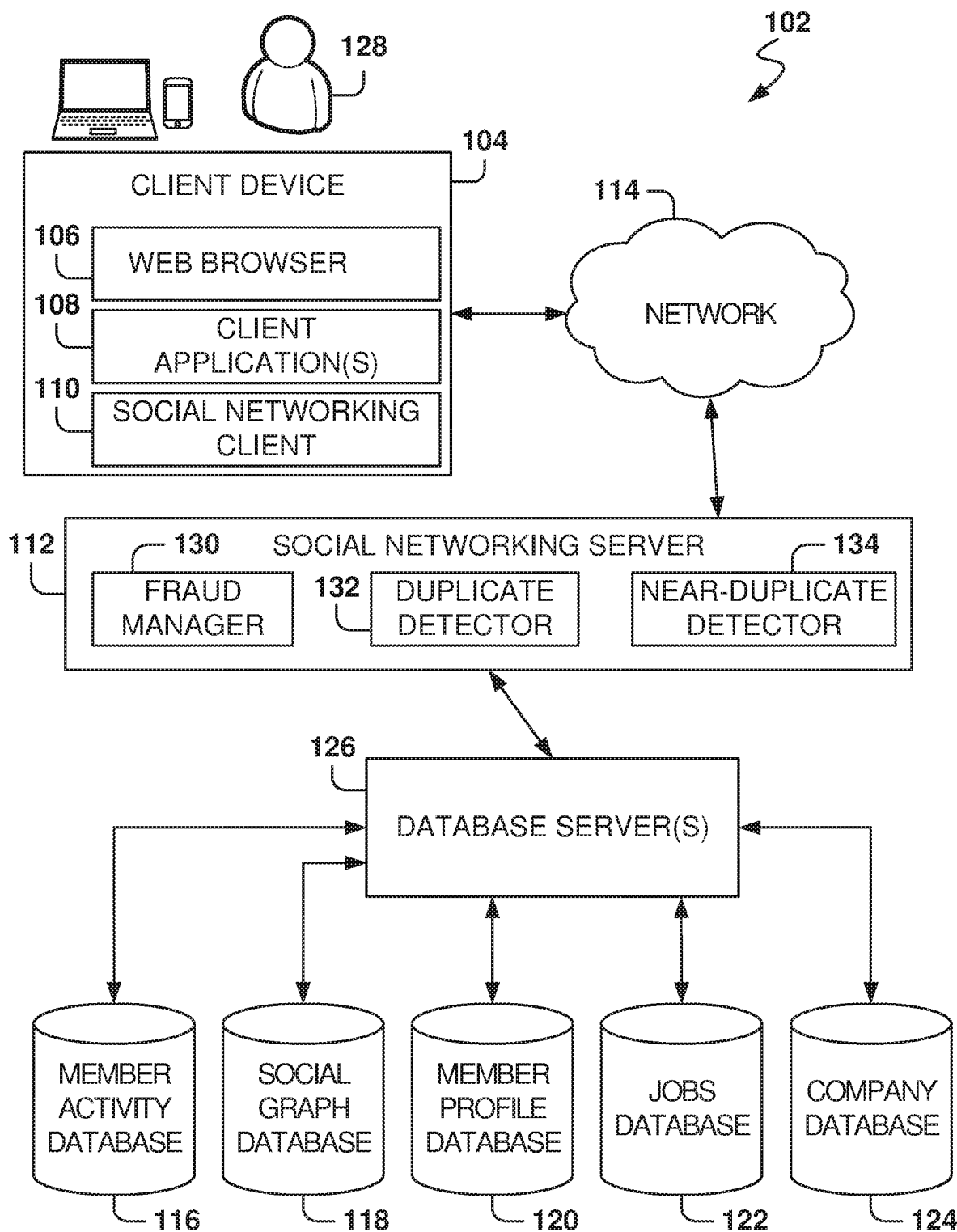
FIG. 1 is a block diagram illustrating a networked system, according to some example embodiments, including a social networking server.

Example methods, systems, and computer programs are directed to detecting near-duplicate profile images of the users in a social network, according to some example embodiments. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Malicious users often reuse the same picture as their profile picture, so one way to detect them is by determining duplicate profile images. However, many times, the malicious users make small changes to the profile picture to try to avoid detection by creating near-duplicate images, such as by cropping the image, changing the brightness of the image, changing the background, changing some of the color, etc. In this case, exact-duplicate detectors will not be able to identify the near-duplicate images.

One implementation includes detecting faces in profile images and pre-processing the face images to standardize data representation (e.g., resize and remove noise) for featurization. The images are then featurized by converting each image to a feature vector utilizing a neural network. The feature vectors are then organized in buckets based on the dominant feature within the image feature vector, where the dominant feature is the feature in the feature vector having the highest value.

When a new image is received for detection of duplicates or near duplicates, the image feature vector is calculated for the new image and the image feature vector is checked for duplicates and near duplicates based on the bucket scheme, which is correlated to the dominant feature within the image feature vector. The feature vectors are indexed within each bucket such that the index allows the easy retrieval of the nearest neighbors of a query feature vector, where the nearest neighbors are those whose feature vector is close (e.g., inside a small distance within the hyperspace used for the feature vectors) to the query feature vector.

In one implementation, a method is provided. The method includes operations for identifying an image in a profile of a user of a social network, and for determining a query feature vector for the image, the query feature vector comprising a value for each of a plurality of features. The method further includes an operation for determining a dominant feature from the plurality of features, the dominant feature having a highest value from the values of the plurality of features. A bucket in a database of feature vectors is determined based on the dominant feature. The method further includes operations for determining if the query feature vector is a near duplicate of any feature vector in the determined bucket, and determining if the profile of the user is a duplicate profile or a fake profile based on whether the query feature vector is a near duplicate of any feature vector in the determined bucket.

In another implementation, a system includes a memory comprising instructions and one or more computer processors. The instructions, when executed by the one or more computer processors, cause the one or more computer processors to perform operations comprising: identifying an image in a profile of a user of a social network; determining a query feature vector for the image, the query feature vector comprising a value for each of a plurality of features; determining a dominant feature from the plurality of features, the dominant feature having a highest value from the values of the plurality of features; determining a bucket in a database of feature vectors based on the dominant feature; determining if the query feature vector is a near duplicate of any feature vector in the determined bucket; and determining if the profile of the user is a duplicate profile or a fake profile based on whether the query feature vector is a near duplicate of any feature vector in the determined bucket.

In yet another implementation, a non-transitory machine-readable storage medium includes instructions that, when executed by a machine, cause the machine to perform operations comprising: identifying an image in a profile of a user of a social network; determining a query feature vector for the image, the query feature vector comprising a value for each of a plurality of features; determining a dominant feature from the plurality of features, the dominant feature having a highest value from the values of the plurality of features; determining a bucket in a database of feature vectors based on the dominant feature; determining if the query feature vector is a near duplicate of any feature vector in the determined bucket; and determining if the profile of the user is a duplicate profile or a fake profile based on whether the query feature vector is a near duplicate of any feature vector in the determined bucket.

FIG. 1 is a block diagram illustrating a networked system, according to some example embodiments, including a social networking server 112, illustrating an example embodiment of a high-level client-server-based network architecture 102. The social networking server 112 provides server-side functionality via a network 114 (e.g., the Internet or a wide area network (WAN)) to one or more client devices 104. FIG. 1 illustrates, for example, a web browser 106, client application(s) 108, and a social networking client 110 executing on a client device 104. The social networking server 112 is further communicatively coupled with one or more database servers 126 that provide access to one or more databases 116-124.

The client device 104 may comprise, but is not limited to, a mobile phone, a desktop computer, a laptop, a portable digital assistant (PDA), a smart phone, a tablet, a netbook, a multi-processor system, a microprocessor-based or programmable consumer electronic system, or any other communication device that a user 128 may utilize to access the social networking server 112. In some embodiments, the client device 104 may comprise a display module (not shown) to display information (e.g., in the form of user interfaces). In further embodiments, the client device 104 may comprise one or more of touch screens, accelerometers, gyroscopes, cameras, microphones, global positioning system (GPS) devices, and so forth.

In one embodiment, the social networking server 112 is a network-based appliance that responds to initialization requests or search queries from the client device 104. One or more users 128 may be a person, a machine, or other means of interacting with the client device 104. In various embodiments, the user 128 is not part of the network architecture 102, but may interact with the network architecture 102 via the client device 104 or another means.

The client device 104 may include one or more applications (also referred to as "apps") such as, but not limited to, the web browser 106, the social networking client 110, and other client applications 108, such as a messaging application, an electronic mail (email) application, a news application, and the like. In some embodiments, if the social networking client 110 is present in the client device 104, then the social networking client 110 is configured to locally provide the user interface for the application and to communicate with the social networking server 112, on an as-needed basis, for data and/or processing capabilities not locally available (e.g., to access a member profile, to authenticate a user 128, to identify or locate other connected members, etc.). Conversely, if the social networking client 110 is not included in the client device 104, the client device 104 may use the web browser 106 to access the social networking server 112.

Further, while the client-server-based network architecture 102 is described with reference to a client-server architecture, the present subject matter is of course not limited to such an architecture, and could equally well find application in a distributed, or peer-to-peer, architecture system, for example.

In addition to the client device 104, the social networking server 112 communicates with the one or more database server(s) 126 and database(s) 116-124. In one example embodiment, the social networking server 112 is communicatively coupled to a member activity database 116, a social graph database 118, a member profile database 120, a jobs database 122, and a company database 124.

The member profile database 120 stores member profile information about members who have registered with the social networking server 112. With regard to the member profile database 120, the member may include an individual person or an organization, such as a company, a corporation, a nonprofit organization, an educational institution, or other such organizations.

Consistent with some example embodiments, when a user initially registers to become a member of the social networking service provided by the social networking server 112, the user is prompted to provide some personal information, such as name, age (e.g., birth date), gender, profile image, interests, contact information, home town, address, spouse's and/or family members' names, educational background (e.g., schools, majors, matriculation and/or graduation dates, etc.), employment history (e.g., companies worked at, periods of employment for the respective jobs, job titles), professional industry (also referred to herein simply as "industry"), skills, professional organizations, and so on. This information is stored, for example, in the member profile database 120. Similarly, when a representative of an organization initially registers the organization with the social networking service provided by the social networking server 112, the representative may be prompted to provide certain information about the organization, such as a company industry. This information may be stored, for example, in the member profile database 120.

In some example embodiments, the company database 124 stores information regarding companies in the member's profile. A company may also be a member; however, some companies may not be members of the social network even though some of the employees of the company may be members of the social network. The company database 124 includes company information, such as name, industry, contact information, website, address, location, geographic scope, and the like.

As users interact with the social networking service provided by the social networking server 112, the social networking server 112 is configured to monitor these interactions. Examples of interactions include, but are not limited to, commenting on posts entered by other members, viewing member profiles, editing or viewing a member's own profile, sharing content outside of the social networking service (e.g., an article provided by an entity other than the social networking server 112), updating a current status, posting content for other members to view and comment on, posting job suggestions for the members, searching job posts, and other such interactions. In one embodiment, records of these interactions are stored in the member activity database 116, which associates interactions made by a member with his or her member profile stored in the member profile database 120. In one example embodiment, the member activity database 116 includes the posts created by the users of the social networking service for presentation on user feeds.

The jobs database 122 includes job postings offered by companies in the company database 124. Each job posting includes job-related information such as any combination of employer, job title, job description, requirements for the job, salary and benefits, geographic location, one or more job skills required, day the job was posted, relocation benefits, and the like.

In one embodiment, the social networking server 112 communicates with the various databases 116-124 through the one or more database server(s) 126. In this regard, the database server(s) 126 provide one or more interfaces and/or services for providing content to, modifying content in, removing content from, or otherwise interacting with the databases 116-124. For example, and without limitation, such interfaces and/or services may include one or more Application Programming Interfaces (APIs), one or more services provided via a Service-Oriented Architecture (SOA), one or more services provided via a Representational State Transfer (REST)-Resource Oriented Architecture (ROA), or combinations thereof.

While the database server(s) 126 are illustrated as a single block, one of ordinary skill in the art will recognize that the database server(s) 126 may include one or more such servers. Accordingly, and in one embodiment, the database server(s) 126 implemented by the social networking service are further configured to communicate with the social networking server 112.

In some example embodiments, the social networking server 112 includes, among other modules, a fraud manager 130, a duplicate detector 132, and a near-duplicate detector 134. The fraud manager 130 monitors the social network to identify fraudulent activities and fraudulent users. The duplicate detector 132 assists the fraud manager 130 by analyzing user profile images searching for duplicate profile images. The near-duplicate detector 134 also assists the fraud manager 130 by analyzing the user profile images to find near-duplicate images. The modules may be implemented in hardware, software (e.g., programs), or a combination thereof.

As used herein, a near-duplicate image, also referred to herein simply as a "near duplicate," of a given image is an image that is of the same person as the given image. The near-duplicate image may be derived from the given image by altering the given image, such as by cropping, changing brightness, changing color, changing angle, etc., and the near-duplicate image may also be a different picture of the same user.

Figure 2:
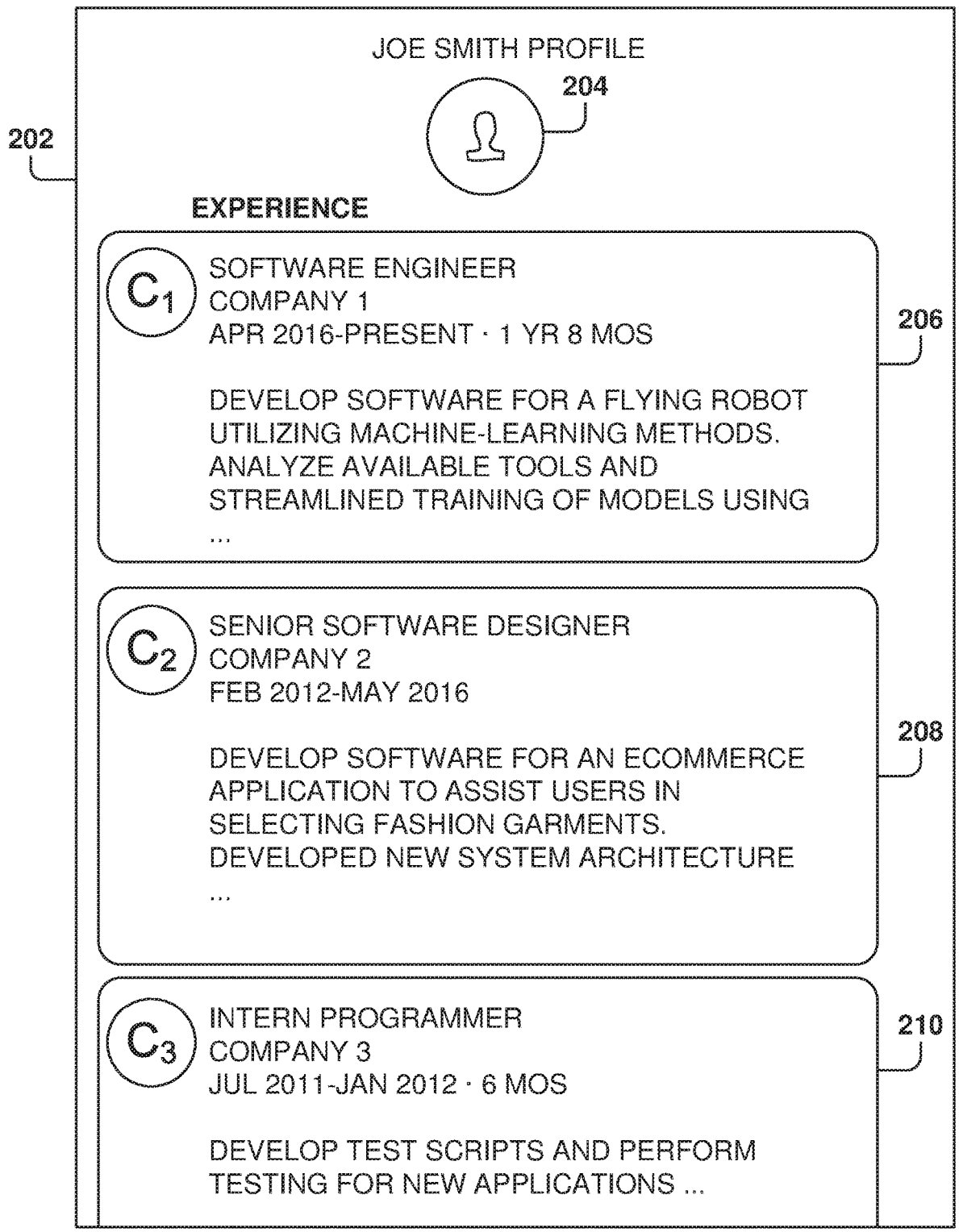
FIG. 2 illustrates a user interface for presenting a user's profile, according to some example embodiments.

FIG. 2 illustrates a user interface 202 for presenting a user's profile, according to some example embodiments. In the example embodiment of FIG. 2, the user's profile includes several jobs 206, 208, 210 held by the user, in a format similar to the one used for a resume. The user interface includes a profile image 204 of the user. The social network requests users to add a profile image 204, but not all users may enter the profile image 204, so some user profiles may not include a profile image 204.

In one example embodiment, each job (206, 208, 210) includes a company logo for the employer (e.g., $C_1$), a title (e.g., software engineer), the name of the employer (e.g., Company 1), dates of employment, and a description of the job tasks or job responsibilities of the user.

Figure 3:
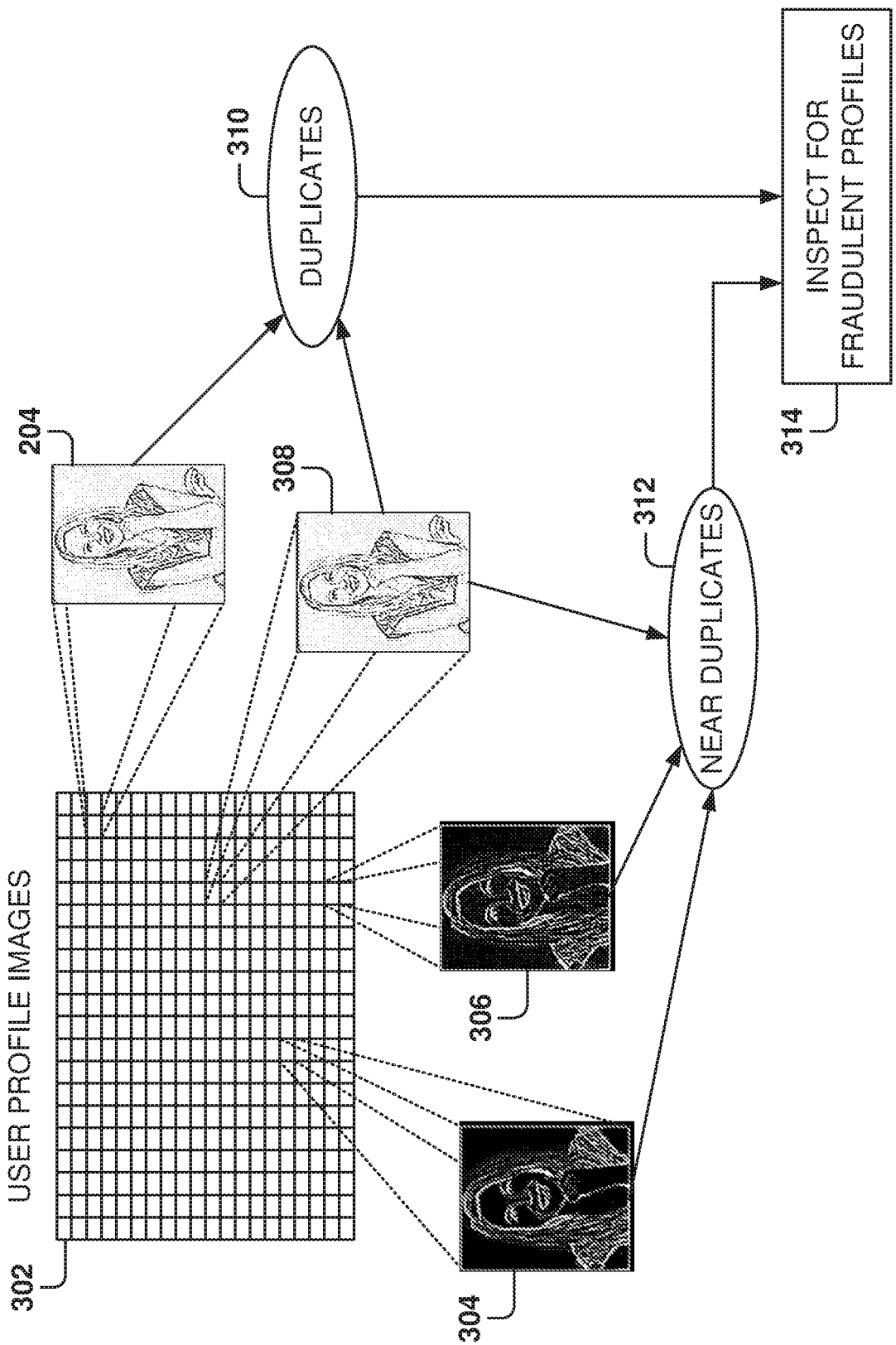
FIG. 3 illustrates the detection of duplicate and near-duplicate profile images for identifying fraudulent profiles, according to some example embodiments.

FIG. 3 illustrates the detection of duplicate and near-duplicate profile images 302 for identifying fraudulent profiles, according to some example embodiments. In the example illustrated in FIG. 3, the profile image 204 is an exact duplicate 310 of another profile image 308. In this case, the two profile images are exactly the same, indicating that the user has reused the same picture to create two different profiles in the social network.

Further, a profile image 304 and a profile image 306 are near duplicates 312 of the profile image 308. The profile image 306 is the result of cropping (e.g., cutting a portion of the image) the profile image 308. In this case, the profile image 306 covers the face but does not cover the bottom half of the person's trunk. Further, the profile image 304 has the same scope of the person as the profile image 306, but the profile image 304 has a different level of brightness. For example, the profile image 304 may have been created by greatly increasing the brightness level of the profile image 306.

If the fraud manager 130 receives information about the duplicates 310 and near duplicates 312, the fraud manager 130 inspects 314 the corresponding profiles to detect fake or duplicate profiles. The fraud manager 130 may look at a variety of parameters to determine fraud, such as by comparing the information in the user profiles (e.g., user address, birth date, education, job title, etc.). Additionally, the fraud manager 130 may compare the activities of the two profiles to detect whether they may be cooperating to send advertisements to different users, generate likes for different articles, criticize other users, etc.

As the number of users in the social network grows, the number of images to be classified grows as well, and the possibility of having similar profile images increases, even though the images may be for different users. For example, a social network may have 150 million profile images, and finding duplicates and near duplicates on such a large scale is a challenging task. For example, if an algorithm were to compare each profile image with all the other images in the social network, the computational resources required to analyze for duplicates and near duplicates would be prohibitively expensive. In some example embodiments, numeric vector data is calculated for each of the profile images, and the numeric vector data, referred to herein as a feature vector, is used to classify and compare images, as described in more detail below.

The algorithm for searching for duplicates and near duplicates takes into consideration that the pictures might have different colors, cropping, rotations, etc., may be low-quality images in which the face may not be prominent, or may be drawings or cartoons that are not true representations of the person.

Figure 4:
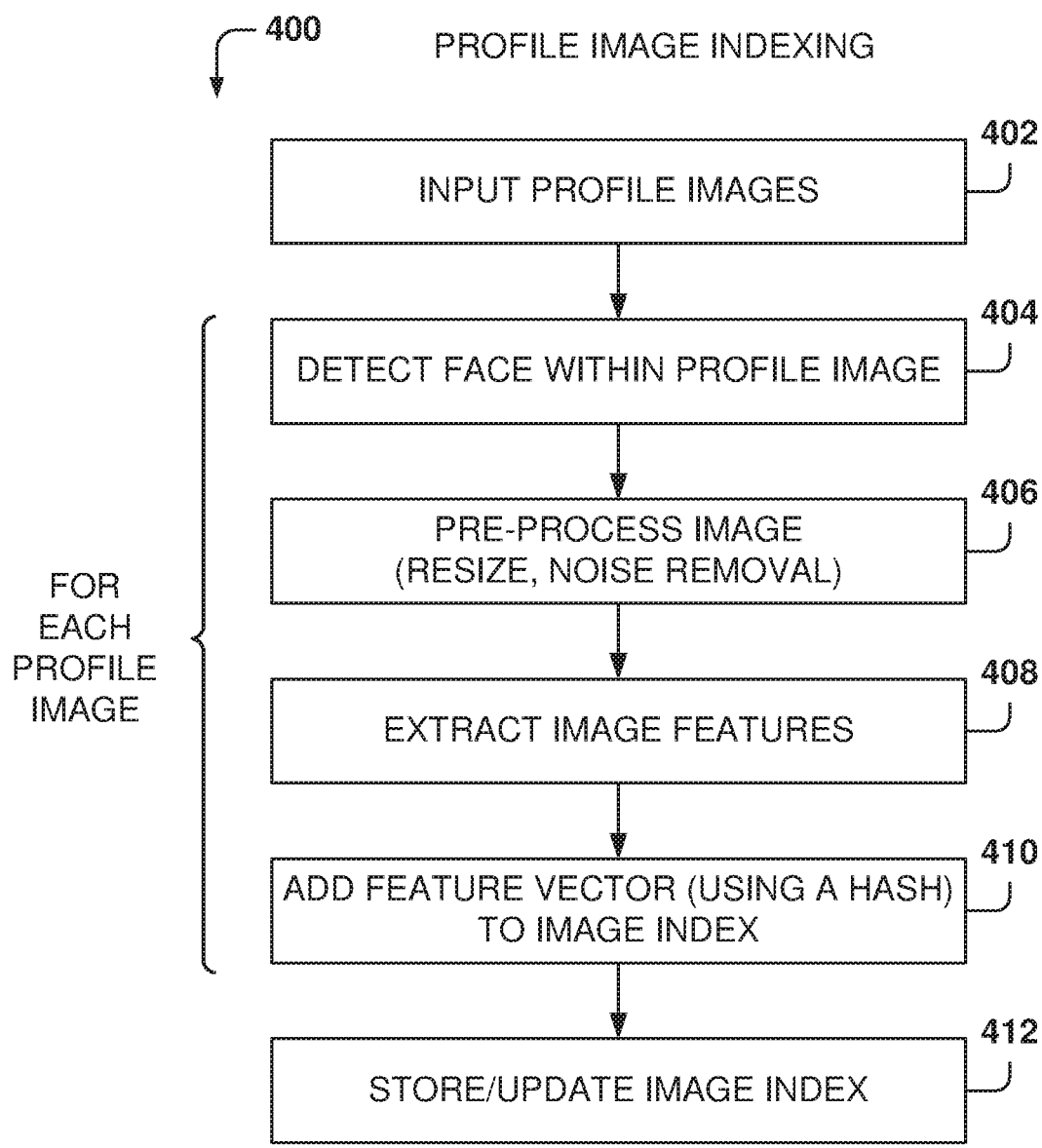
FIG. 4 is a flowchart of a method for indexing profile images, according to some example embodiments.

FIG. 4 is a flowchart of a method 400 for indexing profile images, according to some example embodiments. While the various operations in this flowchart are presented and described sequentially, one of ordinary skill will appreciate that some or all of the operations may be executed in a different order, be combined or omitted, or be executed in parallel.

At operation 402, one or more profile images to be indexed are input. For each profile image, operations 404, 406, 408, and 410 are performed. At operation 404 the profile image is analyzed to detect the face area within the profile image. In some example embodiments, the target is to identify fake profiles with fake images that do not include cartoons, paintings, natural scenery, etc.; e.g., the target is to identify near-duplicate images of actual, real people. If the profile image is a scenery picture that does not include a face, this profile image is not considered a true representation of a person. This is why, at operation 404, a face-detection algorithm is utilized to find faces of real people and index only those images of real people.

If a face is detected at operation 404, the method flows to operation 406, where the profile image is pre-processed. The pre-processing is performed to standardize the size of the face image before feature extraction. The pre-processing includes one or more of resizing the image to cover the face and removing noise from the image.

From operation 406, the method flows to operation 408, where the image features are extracted. In some example embodiments, the extraction is performed by a neural network, and the result is a feature vector, as described below in more detail with reference to FIG. 5. The feature vector is a vector of real numbers, where each element of the vector corresponds to a feature with a respective value. In some example embodiments, the feature vector is 128 elements long, but other sizes of feature vectors may be utilized. In some example embodiments, the dimension of the feature vector is in a range from 25 to 1024.

From operation 408, the method flows to operation 410, where the feature vector is stored in a database containing feature vectors and an image index is the database is updated accordingly. The database is indexed based on the feature values in the feature vector, and a hash is created that accelerates the fast retrieval of feature vectors that are similar to a given feature vector. More details regarding the index are provided below with reference to FIG. 6.

From operation 410, the method flows to operation 412, where the image index is stored or updated in the database containing the feature vectors.

Figure 5:
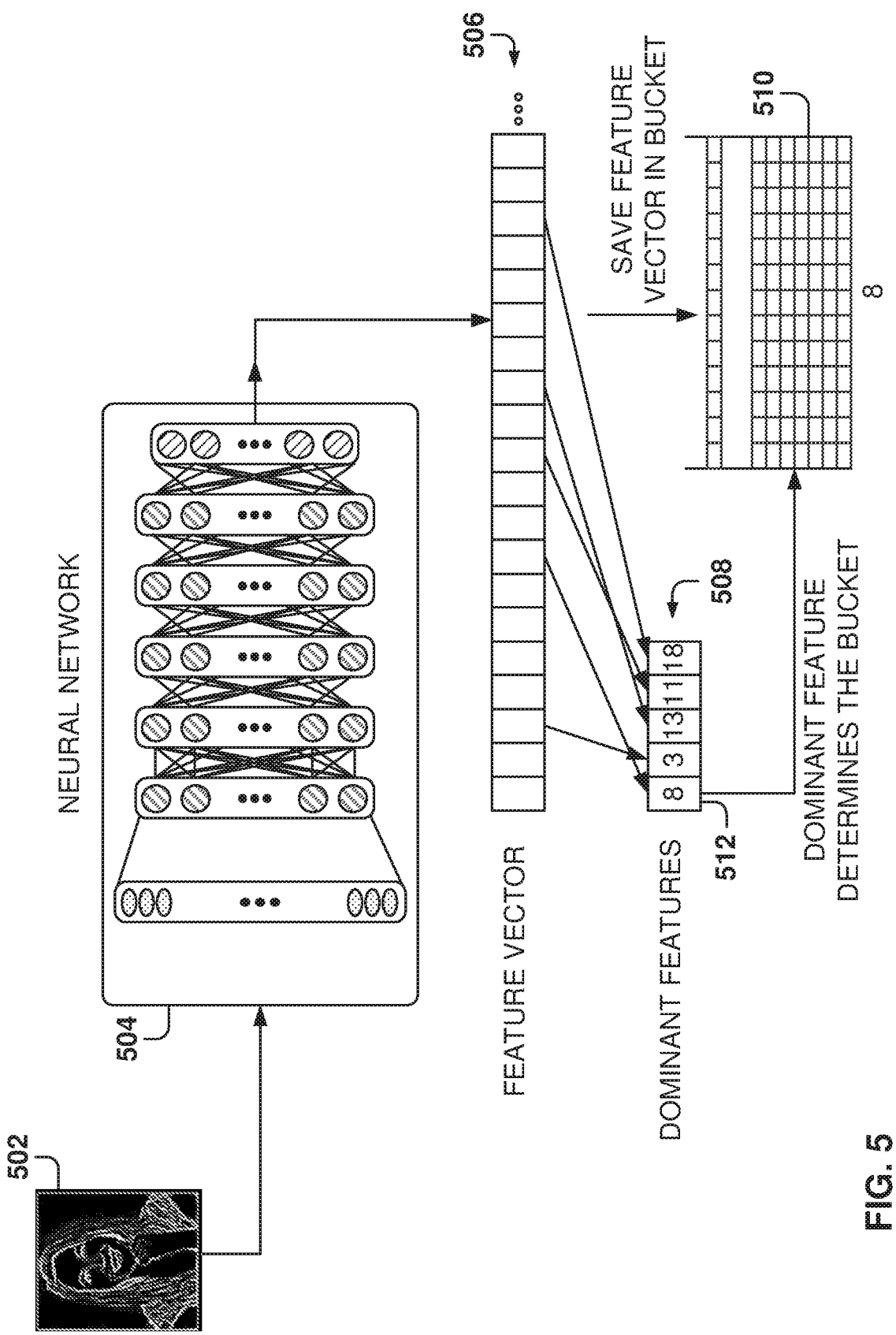
FIG. 5 is a diagram illustrating the vectorization of a profile image by a neural network, according to some example embodiments.

FIG. 5 is a diagram illustrating the vectorization of a profile image by a neural network, according to some example embodiments. A profile image 502 is input to a neural network 504 in order to convert the image data (e.g., pixel data, RGB data) to a feature vector 506 that represents the profile image 502.

Once two images are converted to respective feature vectors 506, the feature vectors 506 may be compared to determine if the images are similar (or exactly the same) or if the images are dissimilar. In some example embodiments, two images are considered similar when they correspond to the same person and dissimilar if they correspond to different people. In other example embodiments, two images are considered similar if the images are the same or if one image is a transformation of the other (e.g., by cropping, rotating, or changing brightness); otherwise, the images are dissimilar.

Machine learning techniques train models to accurately make predictions on data fed into the models (e.g., what was said by a user in a given utterance; whether a noun is a person, place, or thing; what the weather will be like tomorrow). During a learning phase, the models are developed against a training dataset of inputs to optimize the models to correctly predict the output for a given input. Generally, the learning phase may be supervised, semi-supervised, or unsupervised, indicating a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs, so that the model may develop its own rules to discover relationships within the training dataset.

One type of machine learning is embodied in a neural network 504, sometimes referred to as an artificial neural network, which is a computing system based on consideration of biological neural networks of animal brains. Such systems progressively improve performance, which is referred to as learning, to perform tasks, typically without task-specific programming. For example, in image recognition, the neural network 504 may be taught to identify images that contain an object by analyzing example images that have been tagged with a name for the object and, having learnt the object and name, use the analytic results to identify the object in untagged images. The neural network 504 is based on a collection of connected units called neurons, where each connection, called a synapse, between neurons can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength.

A deep neural network (DNN) is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input, which assigns significance to inputs for the task the algorithm is trying to learn. These input-weight products are summed, and the sum is passed through what is called a node's activation function, to determine whether and to what extent that signal progresses further through the network to affect the ultimate outcome. A DNN uses a cascade of many layers of nonlinear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network 504 performed to map training examples to correct output. In training, if the cost function value is not within a pre-determined range, based on the known training images, a backpropagation is used, where backpropagation is a common method of training artificial neural networks that are used with an optimization method such as a stochastic gradient descent (SGD) method.

Use of backpropagation can include propagation and updating weights. When an input (e.g., the profile image 502) is presented to the neural network 504, the input is propagated forward through the neural network, layer by layer, until the input reaches the output layer. The output of the neural network is then compared to the desired output, using the cost function, and an error value is calculated for each of the nodes in the output layer. The error values are propagated backwards, starting from the output, until each node has an associated error value which roughly represents its contribution to the original output. Backpropagation can use these error values to calculate the gradient of the cost function with respect to the weights in the neural network.

The calculated gradient is fed to the selected optimization method to update the weights to attempt to minimize the cost function.

The neural network 504 computes the representation of the face in the form of features. The neural network 504 is trained with thousands (or millions) of images, so that whatever feature vector is generated, the feature values which belong to the same image will be close to each other and the feature values belonging to different images will differ greatly for, at least, a plurality of the features.

In some example embodiments, the distance, in the hyperspace of the feature vectors, is calculated to determine if the feature vectors correspond to the same image. When the vector distance is small, the feature vectors correspond to the same image; otherwise, the feature vectors correspond to different images. In some example embodiments, a threshold distance is utilized for determining similarity, where two feature vectors are considered to be of the same image when the distance is equal to or less than the threshold distance.

In some example embodiments, the distance may be calculated utilizing cosine similarity. In other example embodiments, the distance may be calculated utilizing the Euclidean distance, but other types of distance calculations may also be utilized.

In some example embodiments, the OpenFace tool is utilized for calculating the feature vector. OpenFace is a tool for facial landmark detection, head pose estimation, facial action unit recognition, and eye-gaze estimation. OpenFace is a Python and Torch implementation of face recognition with deep neural networks. OpenFace performs transformations of the face for the neural network to try to make the eyes and bottom lip appear in the same location on each image.

Further, OpenFace uses a deep neural network to represent (or embed) the face on a 128-dimensional unit hypersphere. The embedding is a generic representation for anybody's face. Unlike other face representations, this embedding has the property that a larger distance between two face embeddings means that the faces are likely not of the same person. This property makes clustering, similarity detection, and classification tasks easier than they would be using other face recognition techniques where the Euclidean distance between features is not meaningful.

Using a dense feature vector to represent many types of faces makes it easy to compare the similarity of a large number of faces. For example, if there are 150 million images to be classified, all these images may be converted to feature vectors of the same size.

After the feature vector 506 is identified, one or more dominant features 508 are determined. Dominant features are the features with the largest values in the feature vector. Thus, the most dominant feature, or simply the dominant feature, is the feature with the highest value within the feature vector. The top five dominant features are the five features with the highest values, etc. In general, it has been observed that the higher the value of a feature, the more important or relevant the feature is for image recognition.

In some example embodiments, the feature vectors 506 are stored in a feature-vector database that is indexed based on the dominant features. The feature-vector database is organized into buckets 510 (only one bucket shown), where each bucket 510 is associated with a dominant feature DF and the bucket 510 stores the feature vectors whose dominant feature is DF. For example, a feature vector 506 whose dominant feature is 8 (e.g., the $8^{th}$ element of the feature vector 506 has the highest value from all the values in the feature vector 506) will be stored in bucket 8. Thus, if the feature vector 506 has a dimension of 128, the feature-vector database includes 128 buckets.

In other example embodiments, more than one dominant feature may be used for indexing the feature-vector database. For example, the database may include buckets based on the top two dominant features, on the top three dominant features, etc. If the feature-vector database utilizes two dominant features for bucketing, 8128 buckets are created (128×127×½).

Once a new feature vector 506 is created, the feature vector 506 is saved in the corresponding bucket 510, according to the dominant feature 512. In the example of FIG. 5, the dominant feature is feature 8, and the feature vector 506 is stored in bucket 8.

Figure 6:
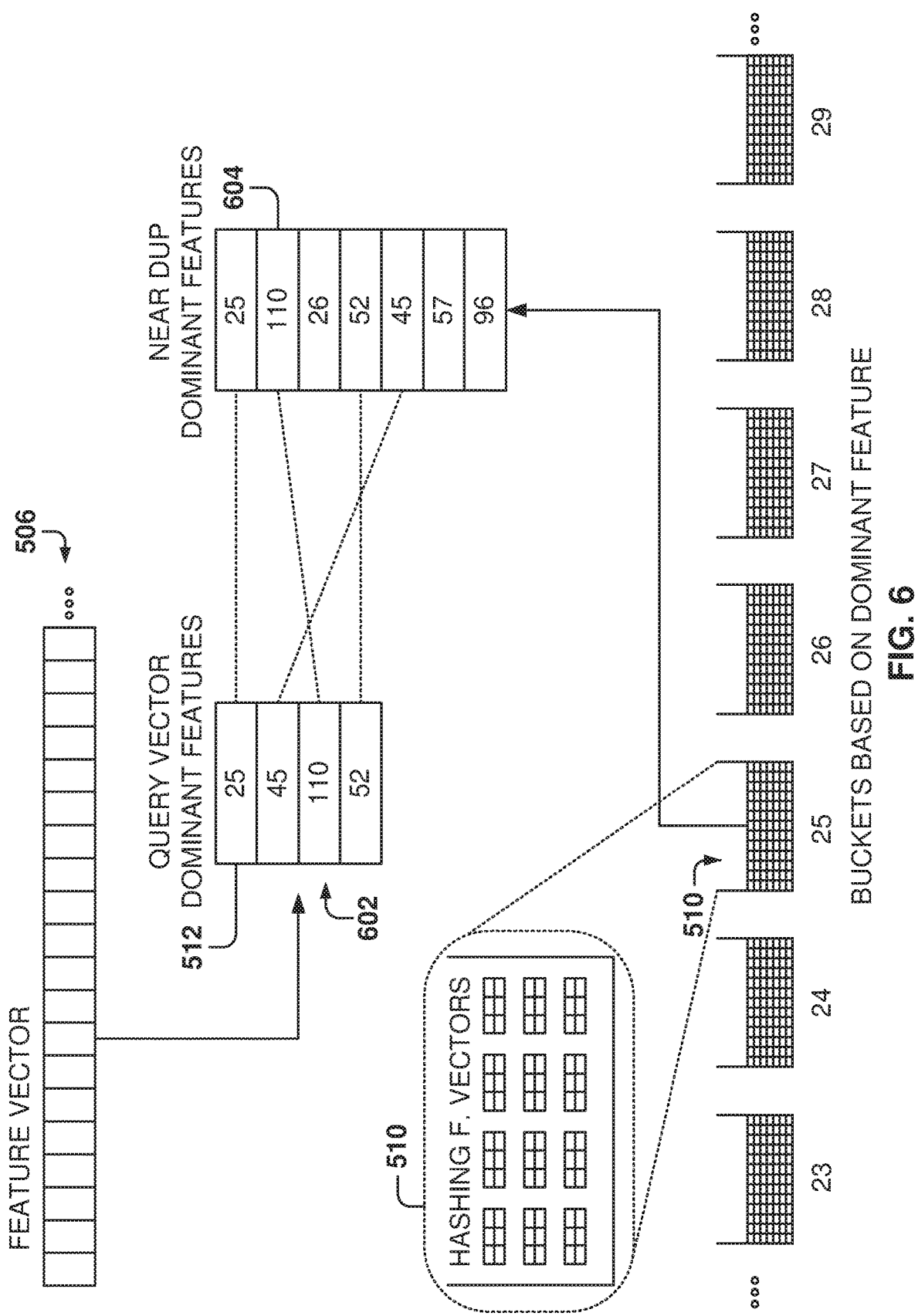
FIG. 6 is a diagram illustrating the detection of near duplicates based on one or more dominant features, according to some example embodiments.

FIG. 6 is a diagram illustrating the detection of near duplicates based on one or more dominant features, according to some example embodiments. FIG. 6 illustrates an example of two feature vectors that are near duplicates.

The feature vector 506 is analyzed to identify a plurality of top dominant features 602. In this case, the top four dominant features are identified. It has been observed that near-duplicate images tend to share the top dominant features. In this example, the feature vector 506 has the top dominant features 25, 45, 110, and 52. A near-duplicate feature vector has dominant features 604: 25, 110, 26, 52, 45, etc. In both cases, the top dominant feature is 25; feature 45 is second in the dominant features 602 and fifth in the dominant features 604; feature 110 is third in the dominant features 602 and second in the dominant features 604; etc.

Therefore, in some example embodiments, the search for near duplicates is constrained to one or more of the buckets 510 associated with the top dominant features. For example, only the bucket for the dominant feature may be searched for near duplicates. In other embodiments, the buckets associated with the top two dominant features are searched, etc. Depending on the implementation, the number of buckets searched may be in the range from one to twenty, although other values are also possible.

In some experiments, it has been observed that the maximum drift for the top feature is one position (e.g., the dominant feature for a given image will be in the first or second position for near duplicates), and for second and third top features the drift is one to three positions.

In large data sets, there could be millions of images. Creating buckets greatly reduces the number of images to be compared (e.g., feature vectors to be compared), but the number of comparisons may still be large if a feature vector has to be compared to all the other feature vectors in the bucket.

In order to accelerate the searches within the bucket, the feature vectors in the bucket 510 are hashed, so only a subset of feature vectors have to be checked for near duplicates. The hash is such that feature vectors that are close to each other will produce the same hash value, which means that to identify near duplicates, only the feature vectors in the bucket with the same hash value need to be searched. More details are provided below with reference to FIG. 7 regarding the process for finding near duplicates.

The problem of similarity search, also known as nearest neighbor search, proximity search, or close item search, is to find an item that is the nearest to a query item, called a nearest neighbor, under some distance measure, from a search (reference) database. In the case that the reference database is very large or that the distance computation between the query item and the database item is costly, it is often computationally infeasible to find the exact nearest neighbor.

Hashing is a solution for approximate nearest-neighbor search. In general, hashing is an approach of transforming the data item to a low-dimensional representation, or equivalently a short code consisting of a sequence of bits. The application of hashing to approximate nearest-neighbor search includes two operations: indexing data items using hash tables that are formed by storing the items with the same code in a hash bucket, and approximating the distance using the hash computed with short codes.

In some example embodiments, the hashing algorithm utilized is locality-sensitive hashing (LSH). LSH reduces the dimensionality of high-dimensional data and hashes input items so that similar items map to the same hash values, also referred to herein as hash numbers or hash buckets, with a high probability. LSH differs from conventional and cryptographic hash functions because it aims to maximize the probability of a "collision" for similar items. Locality-sensitive hashing is related to data clustering and nearest neighbor search.

In some example embodiments. LSH is performed on the top n dominant features, where n is a number from 1 to 128. This means that the hash may be created based on 5 dominant features, 20 dominant features, etc. In other example embodiments, the hash may be calculated for the complete feature vector.

The number of buckets is based on the number of dominant features used for indexing. For example, if the number of dominant features is one, the number of buckets is 128; if the number is two, the number of buckets is 8128 (128×127×4, the number of combinations when choosing two features out of 128). In some example embodiments, as the amount of indexed data grows, the number of dominant features used for indexing may be increased to reduce the number of items in each bucket.

Therefore, when a feature vector is stored in the database, the bucket based on the dominant feature, or features, is identified, a hash of the feature vector is calculated, and then the feature vector is stored in the bucket with the corresponding hash value.

Figure 7:
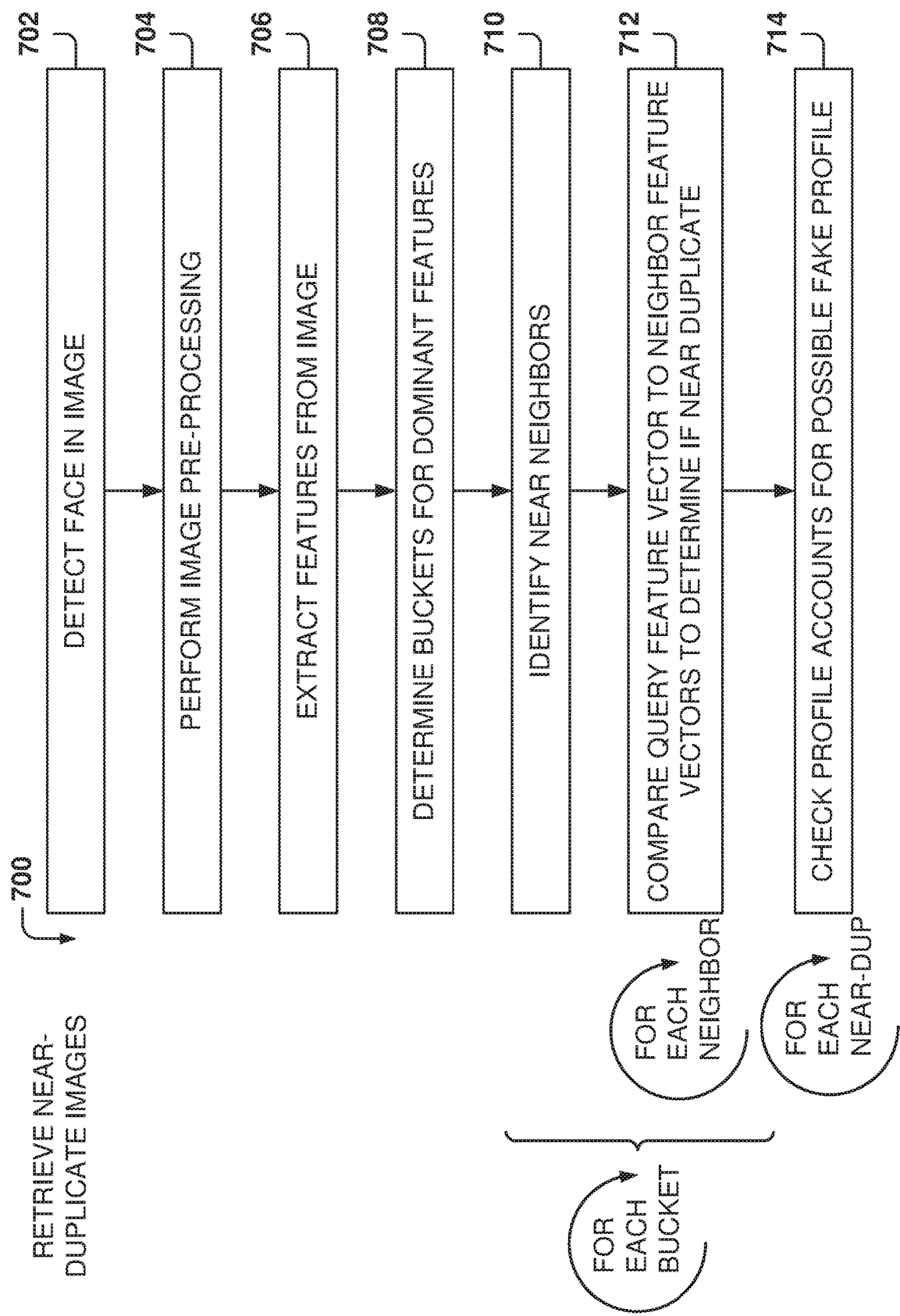
FIG. 7 is a flowchart of a method for retrieving near-duplicate images, according to some example embodiments.

FIG. 7 is a flowchart of a method 700 for retrieving near-duplicate images, according to some example embodiments. While the various operations in this flowchart are presented and described sequentially, one of ordinary skill will appreciate that some or all of the operations may be executed in a different order, be combined or omitted, or be executed in parallel.

At operation 702, the query image (e.g., image file) is analyzed to detect the face and extract the face image data from the overall profile image. By focusing the analysis on the face, instead of on the overall picture, it is easier to identify near duplicates because there are no additional factors to consider, such as clothing, background, etc.

From operation 702, the method flows to operation 704, where the face image is pre-processed. The pre-processing is performed to standardize the size of the face image before feature extraction. The pre-processing includes one or more of resizing the image to cover the face and removing noise from the image.

From operation 704, the method flows to operation 706, where the features are extracted from the image of the face; that is, the feature vector is created, which is referred to as the query feature vector.

In operation 708, one or more dominant buckets are identified based on the dominant features of the query feature vector. Different implementations may utilize a different number of buckets for searching for near duplicates. For example, in some implementations, one bucket for the dominant feature is searched for near duplicates, and in other embodiments, the two buckets associated with the top two dominant features are searched.

Operations 710 and 712 are performed for each of the buckets where the search is being performed. At operation 710, the near neighbors of the query feature vector are identified within the bucket being searched. A near-neighbor feature vector of the query feature vector is a feature vector that is close in distance (e.g., Euclidean distance) to the query feature vector. When utilizing LSH, the near-neighbor feature vectors are those feature vectors with the same LSH hash as the query feature vector. That is, the search for the near-duplicate images is confined to those feature vectors in the same hash bucket as the query feature vector.

From operation 710, the method flows to operation 712, which is performed for each of the near neighbors identified at operation 710. At operation 712, the query feature vector is compared to the near neighbor to determine if the near neighbor is a near duplicate. In some example embodiments, the comparison includes determining a distance between the two vectors (e.g., Euclidean distance or cosine similarity), and if the distance is below a predetermined threshold, the two vectors are considered to be associated with near-duplicate images.

From operation 712, the method flows to operation 714, where the profile accounts associated with the near duplicates are checked for possible fake profiles or some other type of fraud. For example, a user may be trying to impersonate a famous person or company.

Based on some experiments, it is estimated that about 350,000 images, out of 150 million images, are duplicates or near duplicates. By identifying the near duplicates, the search for fake and fraudulent profiles is accelerated by narrowing the number of profiles to be examined for fraud.

Checking for fake and fraudulent profiles may include examining the user profile data, such as name, address, company, education history, IP address, etc.

Further, in some experiments, it has been observed that a query to detect near-duplicate images has been sped up by a factor of 200 by using the embodiments described herein. Further, some experiments have provided a recall of 89% with 97% precision using multiple scores (face-based and full-image-based) on 3 million images, but a higher recall may be obtained by fine tuning the parameters of the search, such as by using two-dimensional bucketing.

In some example embodiments, besides comparing face images, a comparison is also made of the complete profile image to determine similarity. By combining face comparison with complete-image comparison, the recall and precision numbers are increased.

Figure 8:
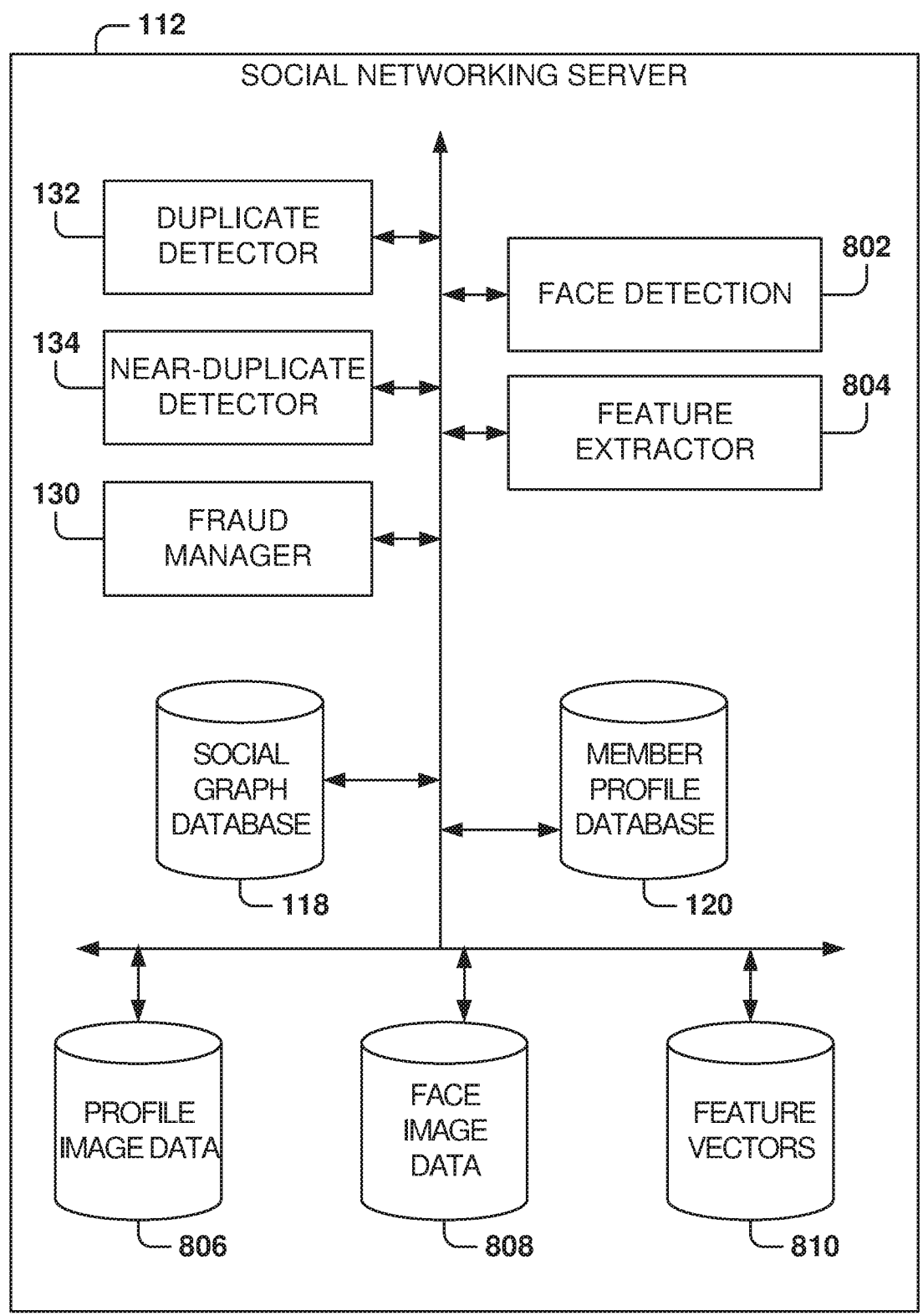
FIG. 8 illustrates a social networking server for implementing example embodiments.

FIG. 8 illustrates a social networking server 112 for implementing example embodiments. In one example embodiment, the social networking server 112 includes a duplicate detector 132, a face detection program 802, a near-duplicate detector 134, a feature extractor 804, a fraud manager 130, and a plurality of databases, which include the social graph database 118, the member profile database 120, a profile image data database 806, a face image data database 808, and a feature vectors database 810.

The duplicate detector 132 performs searches of image data to detect duplicate images. The near-duplicate detector 134 performs searches for identifying near-duplicate profile images, as described above with reference to FIGS. 2-7. The face detection program 802 performs detection of faces within profile images to generate image data associated with the face within the profile image.

Further, the feature extractor 804 generates the feature vector based on the face data. In some example embodiments, the feature extractor 804 is a neural network as described above with reference to FIG. 5. Further, the fraud manager 130 checks user profiles and user activities to identify fake or fraudulent profiles.

The profile image data database 806 contains the profile images for the users of the social network. The face image data database 808 stores the face data extracted from the profile images. Further, the feature vectors database 810 includes the feature vectors for the profile images as described above with reference to FIGS. 5 and 6.

It is to be noted that the embodiments illustrated in FIG. 8 are examples and do not describe every possible embodiment. Other embodiments may utilize different modules or additional modules, combine the functionality of two or more modules into a single module, and so forth. The embodiments illustrated in FIG. 8 should therefore not be interpreted to be exclusive or limiting, but rather illustrative.

Figure 9:
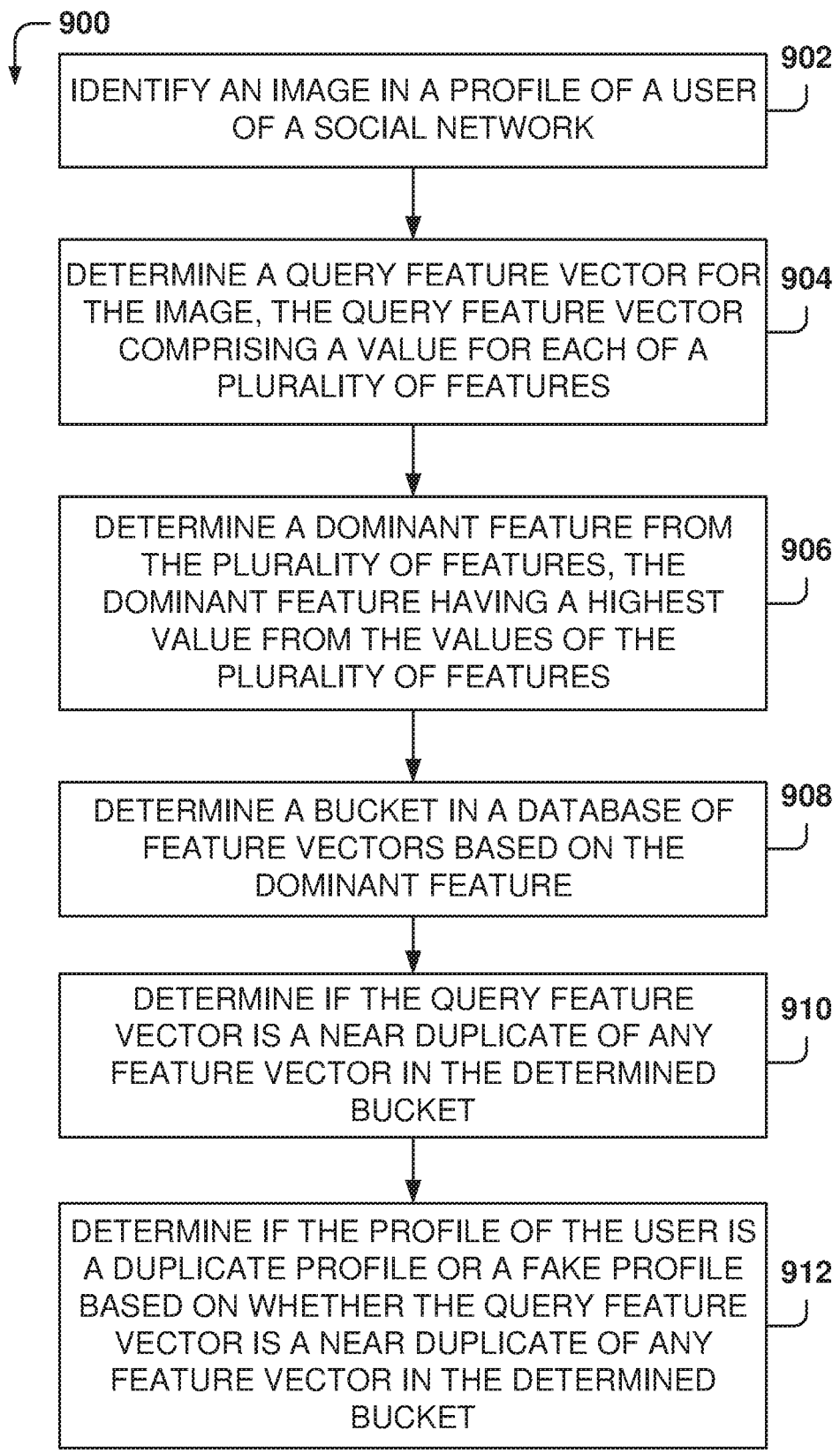
FIG. 9 is a flowchart of a method, according to some example embodiments, for detecting near-duplicate profile images of the users in a social network, according to some example embodiments.

FIG. 9 is a flowchart of a method 900, according to some example embodiments, for detecting near-duplicate profile images of the users in a social network, according to some example embodiments. While the various operations in this flowchart are presented and described sequentially, one of ordinary skill will appreciate that some or all of the operations may be executed in a different order, be combined or omitted, or be executed in parallel.

Operation 902 is for identifying an image in a profile of a user of a social network. Further, operation 904 is for determining, by one or more processors, a query feature vector for the image. The query feature vector includes a value for each of a plurality of features.

From operation 904, the method flows to operation 906 for determining, by the one or more processors, a dominant feature from the plurality of features, where the dominant feature has the highest value from the values of the plurality of features.

From operation 906, the method flows to operation 908 for determining, by the one or more processors, a bucket in a database of feature vectors based on the dominant feature.

Further, at operation 910, the one or more processors determine if the query feature vector is a near duplicate of any feature vector in the determined bucket.

From operation 910, the method flows to operation 912 for determining, by the one or more processors, if the profile of the user is a duplicate profile or a fake profile based on whether the query feature vector is a near duplicate of any feature vector in the determined bucket.

In one example, determining if the query feature vector is a near duplicate of any feature vector further includes calculating a hash value for the query feature vector using a hashing algorithm, wherein the hashing algorithm generates a same hash value for feature vectors that are similar, and determining one or more nearest neighbor feature vectors as those feature vectors having the same hash value as the calculated hash value for the query feature vector.

In one example, the method 900 further includes, for each nearest neighbor feature vector, calculating a distance between the nearest neighbor feature vector and the query feature vector, and determining that the nearest neighbor feature vector corresponds to a near-duplicate image of the image of the user.

In one example, the distance is calculated utilizing one of a cosine similarity or a Euclidean distance.

In one example, each bucket in the database of feature vectors is indexed based on the hash value of each of the feature vectors in the bucket.

In one example, the hashing algorithm is locality-sensitive hashing (LSH).

In one example, determining the bucket further includes selecting the bucket associated with an index in the query feature vector corresponding to a highest value of elements of the query feature vector.

In one example, determining the query feature vector further includes detecting a face image within the image, pre-processing the face image to standardize a size of the face image, and generating the query feature vector based on the face image after the pre-processing.

In one example, the query feature vector is generated by a neural network trained with a plurality of labeled face images.

In one example, the method 900 further includes, when near-duplicate feature vectors are determined, performing a search for near-duplicate feature vectors in a second most dominant feature of the query feature vector.

Figure 10:
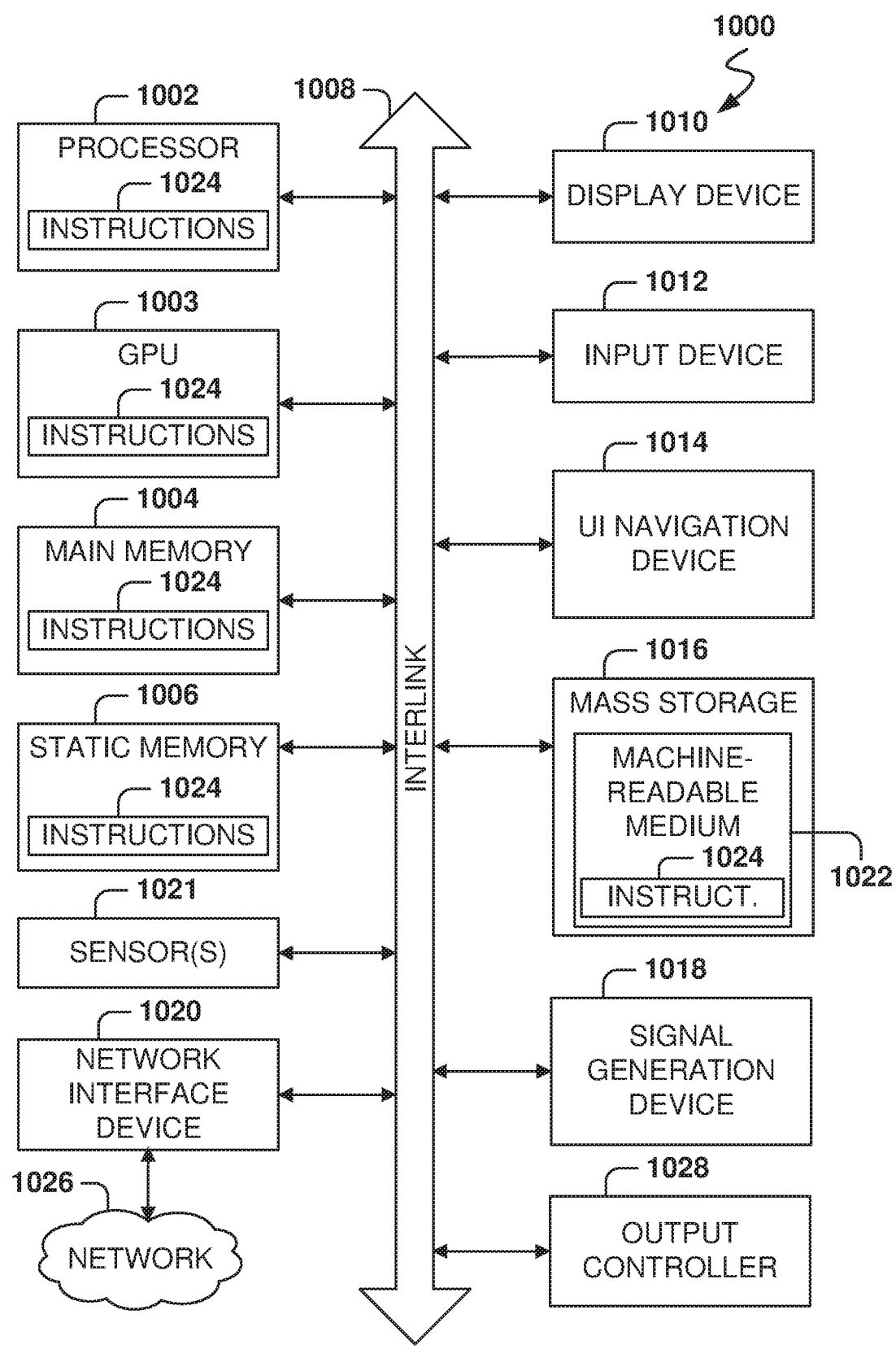
FIG. 10 is a block diagram illustrating an example of a machine upon or by which one or more example process embodiments described herein may be implemented or controlled.

FIG. 10 is a block diagram illustrating an example of a machine 1000 upon or by which one or more example process embodiments described herein may be implemented or controlled. In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in a peer-to-peer (P2P) (or other distributed) network environment. Further, while only a single machine 1000 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, by moveable placement of invariant massed particles, etc.) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1000 may include a hardware processor 1002 (e.g., a central processing unit (CPU), a hardware processor core, or any combination thereof), a graphics processing unit (GPU) 1003, a main memory 1004, and a static memory 1006, some or all of which may communicate with each other via an interlink (e.g., bus) 1008. The machine 1000 may further include a display device 1010, an alphanumeric input device 1012 (e.g., a keyboard), and a user interface (UI) navigation device 1014 (e.g., a mouse). In an example, the display device 1010, alphanumeric input device 1012, and UI navigation device 1014 may be a touch screen display. The machine 1000 may additionally include a mass storage device (e.g., drive unit) 1016, a signal generation device 1018 (e.g., a speaker), a network interface device 1020, and one or more sensors 1021, such as a Global Positioning System (GPS) sensor, compass, accelerometer, or another sensor. The machine 1000 may include an output controller 1028, such as a serial (e.g., universal serial bus (USB)), parallel, or other wired or wireless (e.g., infrared (IR), near field communication (NFC), etc. connection to communicate with or control one or more peripheral devices (e.g., a printer, card reader, etc.).

The mass storage device 1016 may include a machine-readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within the static memory 1006, within the hardware processor 1002, or within the GPU 1003 during execution thereof by the machine 1000. In an example, one or any combination of the hardware processor 1002, the GPU 1003, the main memory 1004, the static memory 1006, or the mass storage device 1016 may constitute machine-readable media.

While the machine-readable medium 1022 is illustrated as a single medium, the term "machine-readable medium" may include a single medium, or multiple media, (e.g., a centralized or distributed database, and/or associated caches and servers) configured to store the one or more instructions 1024.

The term "machine-readable medium" may include any medium that is capable of storing, encoding, or carrying instructions 1024 for execution by the machine 1000 and that cause the machine 1000 to perform any one or more of the techniques of the present disclosure, or that is capable of storing, encoding, or carrying data structures used by or associated with such instructions 1024. Non-limiting machine-readable medium examples may include solid-state memories, and optical and magnetic media. In an example, a massed machine-readable medium comprises a machine-readable medium 1022 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1024 may further be transmitted or received over a communications network 1026 using a transmission medium via the network interface device 1020.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
    identifying an image in a profile of a user of a social network;
    determining, by one or more processors, a query feature vector for the image, the query feature vector comprising a value for each of a plurality of features;
    determining, by the one or more processors, a dominant feature from the plurality of features, the dominant feature having a highest value from the values of the plurality of features;
    determining, by the one or more processors, a bucket in a database of feature vectors based on the dominant feature;
    determining, by the one or more processors, if the query feature vector is a near duplicate of any feature vector in the determined bucket, wherein determining if the query feature vector is a near duplicate of any feature vector in the determined bucket further includes:
        calculating a hash value for the query feature vector using a hashing algorithm, wherein the hashing algorithm generates a same hash value for feature vectors that are similar; and determining one or more nearest neighbor feature vectors as those feature vectors having a same hash value as the calculated hash value for the query feature vector; and determining, by the one or more processors, if the profile of the user is a duplicate profile based on whether the query feature vector is a near duplicate of any feature vector in the determined bucket.

2. The method as recited in claim 1, further including:
for each nearest neighbor feature vector:
calculating a distance between the nearest neighbor feature vector and the query feature vector; and
determining that the nearest neighbor feature vector corresponds to a near-duplicate image of the image of the user.

3. The method as recited in claim 2, wherein the distance is calculated utilizing one of a cosine similarity or a Euclidean distance.

4. The method as recited in claim 1, wherein each bucket in the database of feature vectors is indexed based on the hash value of each of the feature vectors in the bucket.

5. The method as recited in claim 1, wherein the hashing algorithm is locality-sensitive hashing (LSH).

6. The method as recited in claim 1, wherein determining the bucket further includes:
selecting the bucket associated with an index in the query feature vector corresponding to a highest value from the values of the plurality of features of the query feature vector.

7. The method as recited in claim 1, wherein determining the query feature vector further includes:
detecting a face image within the image;
pre-processing the face image to standardize a size of the face image; and
generating the query feature vector based on the face image after the pre-processing.

8. The method as recited in claim 7, wherein the query feature vector is generated by a neural network trained with a plurality of labeled face images.

9. The method as recited in claim 1, further including:
when near-duplicate feature vectors are determined, performing a search for near-duplicate feature vectors based on a second most dominant feature of the query feature vector.

10. The method of claim 1, further comprising:
in response to determining that the profile of the user is a duplicate of a second profile, determining whether the profile of the user is a fake profile based on comparing (a) first profile information, other than the image, in the profile of the user with second profile information in the second profile or (b) first activities associated with the profile and second activities associated with the second profile.

11. A system comprising:
a memory comprising instructions; and
one or more computer processors, wherein the instructions, when executed by the one or more computer processors, cause the one or more computer processors to perform operations comprising:
identifying an image in a profile of a user of a social network;
determining, using a neural network, a query feature vector for the image, the query feature vector comprising a value for each of a plurality of features;
determining a dominant feature from the plurality of features, the dominant feature having a highest value from the values of the plurality of features;

determining a bucket in a database of feature vectors based on the dominant feature;
determining if the query feature vector is a near duplicate of any feature vector in the determined bucket; and
determining if the profile of the user is a duplicate profile based on whether the query feature vector is a near duplicate of any feature vector in the determined bucket;
in response to determining that the profile of the user is a duplicate of a plurality of profiles, determining whether the profile of the user is a fake profile based on comparing, for each profile in the plurality of profiles, first profile information, other than the image, in the profile of the user with second profile information in said each profile, wherein the second profile information is of a second user and is provided by the second user to a social networking service that hosts the first profile information and the second profile information.

12. The system as recited in claim 11, wherein determining if the query feature vector is a near duplicate of any feature vector in the determined bucket further includes:
calculating a hash value for the query feature vector using a hashing algorithm, wherein the hashing algorithm generates a same hash value for feature vectors that are similar; and
determining one or more nearest neighbor feature vectors as those feature vectors having a same hash value as the calculated hash value for the query feature vector.

13. The system as recited in claim 12, wherein the operations further comprise:
for each nearest neighbor feature vector:
calculating a distance between the nearest neighbor feature vector and the query feature vector, wherein the distance is calculated utilizing one of a cosine similarity or a Euclidean distance; and
determining that the nearest neighbor feature vector corresponds to a near-duplicate image of the image of the user.

14. The system as recited in claim 12, wherein each bucket in the database of feature vectors is indexed based on the hash value of each of the feature vectors in the bucket.

15. The system as recited in claim 11, wherein determining the query feature vector further includes:
detecting a face image within the image;
pre-processing the face image to standardize a size of the face image; and
generating the query feature vector based on the face image after the pre-processing.

16. A non-transitory machine-readable storage medium including instructions that, when executed by a machine, cause the machine to perform operations comprising:
identifying an image in a profile of a user of a social network;
determining a query feature vector for the image, the query feature vector comprising a value for each of a plurality of features;
determining a plurality of dominant features from the plurality of features, the plurality of dominant features having the highest values from the values of the plurality of features, wherein the plurality of dominant features is a strict subset of the plurality of features;
determining a plurality of buckets in a database of feature vectors based on the plurality of dominant features;
determining if the query feature vector is a near duplicate of any feature vector in the plurality of buckets; and determining if the profile of the user is a duplicate profile based on whether the query feature vector is a near duplicate of any feature vector in the plurality of buckets.

17. The non-transitory machine-readable storage medium as recited in claim 16, wherein determining if the query feature vector is a near duplicate of any feature vector the plurality of buckets further includes:
- calculating a hash value for the query feature vector using a hashing algorithm, wherein the hashing algorithm generates a same hash value for feature vectors that are similar; and
- determining one or more nearest neighbor feature vectors as those feature vectors having a same hash value as the calculated hash value for the query feature vector.

18. The non-transitory machine-readable storage medium as recited in claim 17, wherein the operations further comprise:
- for each nearest neighbor feature vector:
  - calculating a distance between the nearest neighbor feature vector and the query feature vector, wherein the distance is calculated utilizing one of a cosine similarity or a Euclidean distance; and
  - determining that the nearest neighbor feature vector corresponds to a near-duplicate image of the image of the user.

19. The non-transitory machine-readable storage medium as recited in claim 17, wherein each bucket in the database of feature vectors is indexed based on the hash value of each of the feature vectors in the bucket.

20. The non-transitory machine-readable storage medium as recited in claim 16, wherein determining the query feature vector further includes:
- detecting a face image within the image;
- pre-processing the face image to standardize a size of the face image; and
- generating the query feature vector based on the face image after the pre-processing.

* * * * *